July 30, 1968 H. Z. BOGERT 3,395,292

SHIFT REGISTER USING INSULATED GATE FIELD EFFECT TRANSISTORS

Filed Oct. 19, 1965

INVENTOR.
HOWARD Z. BOGERT

BY Jack M. Wiseman

ATTORNEY 3,395,292

SHIFT REGISTER USING INSULATED GATE FIELD EFFECT TRANSISTORS

Howard Z. Bogert, Cupertino, Calif., assignor to General Micro-Electronics Inc., Santa Clara, Calif., a corporation of Delaware Filed Oct. 19, 1965, Ser. No. 498,026
4 Claims. (Cl. 307—221)

ABSTRACT OF THE DISCLOSURE

Shift register using cascaded single bit delay stages of six insulated gate field effect transistors each. First half of each stage includes data and load transistors in series, source to drain, and an isolation transistor for coupling junction of data and load transistors to gate of data transistor in the identical second half of that stage. Load and isolation transistors of alternate half stages are strobed with out of phase shift pulses, with storage being provided by gate capacitance of data transistors.

The present invention relates in general to microelectronic devices, and more particularly to a shift register employing semiconductor devices.

An object of the present invention is to provide an improved shift register.

Another object of the present invention is to provide a semiconductor shift register in which the number of semiconductor devices required is reduced.

Another object of the present invention is to provide a miniaturized shift register of the integrated circuit type wherein the size of the chip area is reduced.

Another object of the present invention is to provide a semiconductor shift register wherein power consumption is reduced.

Other and further objects and advantages will be apparent to one skilled in the art from the following description taken in conjunction with the accompanying drawings, in which.

*Description*

Figure 1:
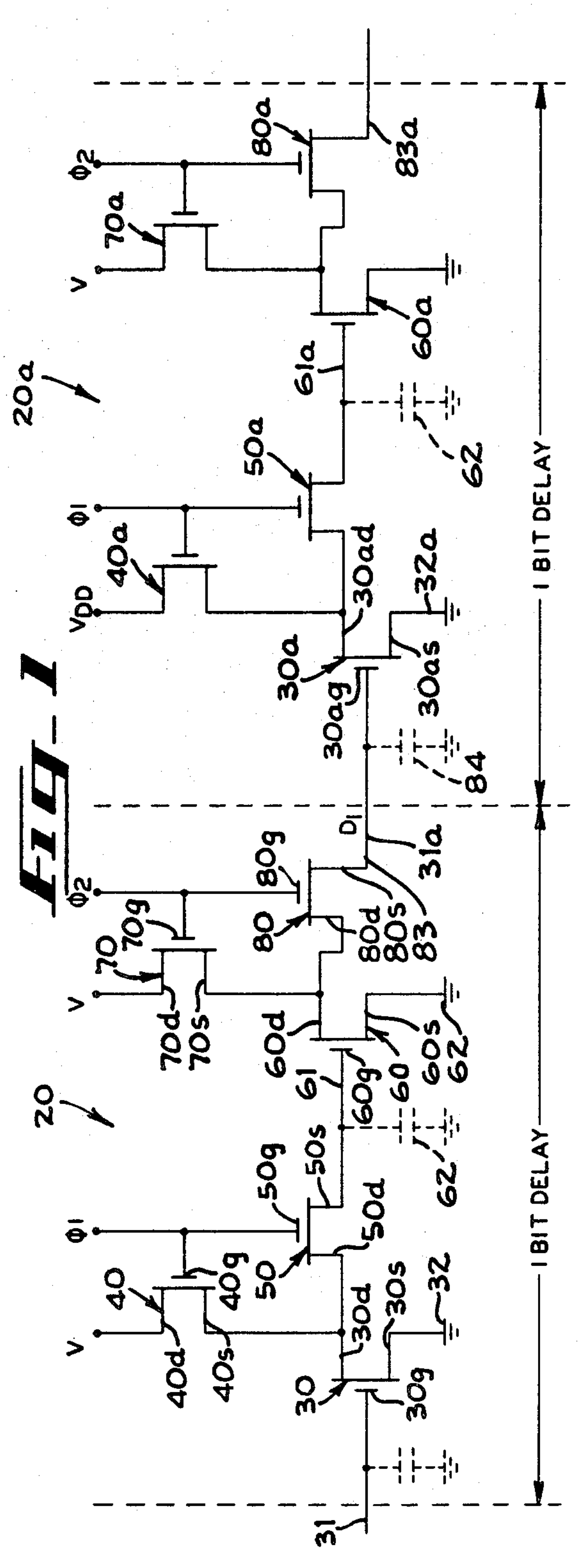
FIG. 1 is a schematic diagram of a shift register embodying the present invention.

Illustrated in FIG. 1 is the shift register of the present invention. The shift register comprises a plurality of cascaded stages, such as 20 and 20*a*, embodied in a single or integral semiconductor body, such as an N-type silicon monocrystalline substrate or wafer. In an exemplary embodiment of the present invention, 100 stages were cascaded to form a 100 bit shift register.

For purpose of simplicity, only stage 20 will be described in detail, since the operation and construction of stage 20*a* is similar to stage 20.

The construction of insulated gate field-effect transistors (IGFET's), including the usual gate electrode, source electrode, and drain electrode is conventional and well-known in the art. The IGFETS's stage 20*a* that correspond with IGFET's of stage 20 will be assigned the same reference numeral with the suffix *"a."* Stages 20 and 20*a* are connected in cascade to form a chain for a successive and sequential operation. Interconnections between the successive stages, as well as between the IGFET's of each stage are established in a well-known and conventional manner by metallic surface conductors on the integrated circuit.

As shown in FIG. 1, stage 20 comprises a data input IGFET 30, which includes a gate electrode 30*g*, a drain electrode 30*d* and a source electrode 30*s*. An input conductor 31, which is connected to the gate electrode 30*g*, receives a logic data input signal to be stored. The source electrode 30*s* is connected to ground at 32. In the preferred embodiment, the transconductance of IGFET 30 is 100 micromhos.

The input signal fed to the gate electrode 30*g* is a negative pulse. When input signal is negative, IGFET 30 is capable of conducting. While input signal is zero, IGFET 30 is non-conducting.

An IGFET 40 has its source-drain circuit connected in series with that of IGFET 30 and serves as a resistive load element therefor. The load then of IGFET 40 includes a gate electrode 40*g*, a drain electrode 40*d*, and a source electrode 40*s*. A suitable external source of negative supply voltage V is connected to the drain electrode 40*d* of the load device 40. A clock pulse synchronizing voltage $\phi$1 is supplied to the gate electrode 40*g* of the load device 40 for controlling the conduction thereof. The clock voltage $\phi$1 is a series of evenly spaced pulses shown as $\phi$1 in FIG. 2. In the exemplary embodiment, load device 40 has a transconductance of 10 micromhos.

The load device 40 is capable of conducting when the clock pulse $\phi$1 is negative and is rendered non-conductive while the clock pulse $\phi$1 is zero. Since the load device 40 is in series with the data input device 30, devices 30 and 40 must operate or conduct simultaneously in order for a series current to flow. This will occur when the data input signal supplied to input conductor 31 is negative concurrently with the clock pulse $\phi$1 being negative. When the clock pulse $\phi$1 returns to zero, devices 30 and 40 will be non-conducting.

Connected to the drain electrode 30*d* of device 30 and the source electrode 40*s* of device 40 is a drain electrode 50*d* of an isolation and clock coupled IGFET 50. In addition to drain electrode 50*d*, device 50 has a source electrode 50*s* and a gate electrode 50*d*. The gate electrode 50*g* receives the clock pulse synchronizing voltage $\phi$1. Thus, the field-effect device 50 is capable of conducting while the clock pulse $\phi$1 is negative and is non-conductive when the clock pulse $\phi$1 is zero. It is to be observed that device 40 and device 50 are capable of conducting simultaneously and are non-conducting concurrently. In the preferred embodiment, the transconductance of device 50 is 40 micromhos. Such a device is of minimum dimension to reduce parasitic capacitance.

A data input IGFET 60 has its gate electrode 60*g* connected to the source electrode 50*s* of device 50 by an input conductor 61. The device 60 also includes a source electrode 60*s*, which is connected to ground at 62, and a drain electrode 60*d*. The transconductance of device 60 is the same as device 30.

As shown in FIG. 1, device 60 has a gate-source capacitance 62. A potential charge transmitted over conductor 61 can be stored on the gate capacitance of device 60. Device 60 is non-conductive or off while the potential applied to its gate electrode 60*g* is a near zero and is capable of conducting while the data input signal transmitted over the input conductor 61 is negative.

While device 50 is non-conducting, a high impedance is established between devices 30 and 60, whereby device 60 is electrically isolated from the device 30. On other hand, the conduction of device 50 provides a low impedance path between devices 30 and 60.

Connected in series with the source drain circuit of a load device 60 is device 70, which has a gate electrode 70*g*, a drain electrode 70*d*, and a source electrode 70*s*. The drain electrode 70*d* is supplied with the previously mentioned voltage V. A clock pulse synchronizing voltage $\phi$2 is supplied to the gate electrode 70*g* of the load device 70 for controlling the conduction thereof. The clock voltage $\phi 2$ is a series of evenly-spaced pulses shown as $\phi 2$ in FIG. 2.

Figure 2:
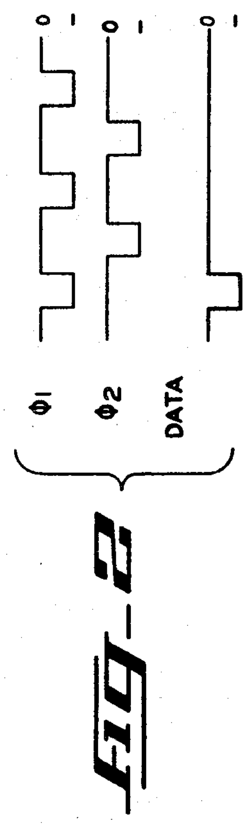
FIG. 2 is a graphic representation of the clock pulse synchronizing signals and data input signal supplied to the shift register of the present invention.

It is to be observed from FIG. 2 that the negative pulses $\phi 1$ are out of time phase with the negative pulses $\phi 2$.

While the field-effect devices 40 and 50 are conducting, the gate electrode 60*g* of device 60 stores a potential charge thereon through the gate-source capacitance thereof 62. The charge path is as follows: source V, device 40, device 50, and gate 60*d*. The charge stored is reduced by the voltage drop across the devices 40 and 50.

An isolating and clock coupled IGFET 80 has its drain electrode 80*d* connected to the drain electrode 60*d* of device 60 and to the source electrode 70*s* of device 70. Device 80 also includes a gate electrode 80*g* which has impressed thereon the clock pulse voltage $\phi 2$. A data input conductor 83 is connected to the source electrode 80*s* for transmitting thereover a data output signal for feeding the succeeding stage 20*a*. The transconductance of device 80 is the same as that of the device 50.

Device 80 is capable of conducting while the clock pulse $\phi 2$ is negative and is non-conductive when the clock pulse $\phi 2$ is zero. Thus, the devices 60, 70, and 80 are capable of conducting simultaneously and are non-conductive concurrently.

While device 80 is non-conducting, a high impedance is established between device 60 and a data input IGFET 30*a*, whereby 30*a* is electrically isolated from device 60. On the other hand, conduction of device 80 provides a low impedance path between devices 30 and 60.

A load IGFET 40*a* has its source electrode connected to the drain electrode 30*ad* of device 30*a* and, hence, is series therewith. A source electrode 30*as* of device 30*a* is conneceted to ground.

The data input device 30*a* has a gate-source capacitance 84. Thus, a negative potential transmitted over conductor 83 can be stored on the gate-source capacitance of device 30*a*. The device 30*a* is non-conductive while the potential applied to its gate electrode 30*ag* is zero and is capable of conducting while the data input signal transmitted over the input conductor 83 is negative.

The load 40*a* is capable of conducting when the clock pulse $\phi 1$ is negative and is rendered non-conductive while the clock $\phi 1$ is zero.

While the field-effect devices 70 and 80 are conducting, the gate electrode 30*ag* of the field-effect device 30*a* can store a negative potential charge thereon. The charge path is as follows: Source V, device 70, device 80, and gate 30*ag*. The charge stored is reduced by the voltage drop across devices 70 and 80.

By employing MOS field-effect devices, a relatively high resistance-capacitance time constant is provided so that the stored charge on the gate electrodes 60*g* and 30*ag* will remain in excess of the interval between the $\phi 2$ and $\phi 1$ clock pulses.

*Operation*

In operation a negative logic signal to be stored is coupled to the gate electrode 30*g* of device 30 during the first cycle of operation to when the $\phi$ signal is present to render devices 30, 40 and 50 conducting, so that any potential present on the gate electrode 60*g* of the field-effect device 60 will be discharged through devices 30 and 50 to near ground.

When the clock pulse signal $\phi 1$ returns to zero, devices 30, 40, and 50 are turned off, leaving device 60 discharged and isolated, whereby the discharged condition is maintained for a period greater than one-half the interval between successive pulses in the clock pulse signal $\phi 1$.

When the clock pulse signal $\phi 2$ is negative the near zero potential on the gate electrode 60*g* will prevent device 60 from conducting. As a consequence thereof, a negative potential representative of the data input signal will be transferred over conductor 83 to the gate electrode 30*ag* of device 30*a*, causing a negative potential to be stored on gate electrode 30*ag*.

When the pulse signal $\phi 2$ returns to zero, devices 60, 70, and 80 are turned off, leaving the charge on gate electrode 30*ag* isolated by device 80, whereby the charge is maintained on the gate electrode 30*ag* for a period greater than one-half the interval between successive pulses in the clock synchronizing pulse signal $\phi 2$.

What the second pulse of the clock pulse signal $\phi 1$ is impressed on the gate electrodes of devices 40*a* and 50*a* any potential on the gate electrode 61*a* discharges through the field-effect devices 50*a* and 30*a* and the above-described sequence is repeated for the succeeding stages.

From the foregoing, it is to be observed that each stage provides a one bit delay. The pulses advance through the stages in synchronism with the clock pulses $\phi 1$ and $\phi 2$.

During a succeeding cycle of the $\phi 1$ and $\phi 2$ clock pulses another negative logic data input signal can be fed to the gate electrode 30*g* of device 30 and will thereupon be propagated in clock synchronism through the shift register as many as 100 data logic signals may be propagated through a 100 stage shift register in clock synchronism.

It is to be understood that modifications and variations of the invention disclosed herein may be resorted to without departing from the spirit of the invention and the scope of the appended claims.

Having thus described my invention, what I claim as new and desire to protect by Letters Patent is:

1. A shift register comprising a first data input semiconductor field-effect device, said first device having a gate electrode, a source electrode, and a drain electrode, means for impressing a data input signal on the gate electrode of said first device for controlling the conduction thereof, a load semiconductor field-effect device with a gate electrode, a source electrode, and a drain electrode, means connecting said source electrode of said load device with the drain electrode of said first device for connecting said load device in series with said first device, a second data input semiconductor field-effect device with a gate electrode, a source electrode, and a drain electrode, said second device being formed with a gate-source capacitance, an isolation semiconductor field-effect device with a gate electrode, a source electrode, and a drain electrode, means connecting the drain electrode of said isolation device to the drain electrode of said first device and the source electrode of said isolation device to the gate electrode of said second device, and means for impressing a synchronizing signal on said gate electrode of said isolation device and the gate electrode of said load device for controlling the conduction thereof between an on state and an off state, whereby said off state of said isolation device isolates said second data input field-effect device from said first device, and said on state of said isolation device forms a path for storing a charge on the gate-source capacitance of said second device.

2. A shift register comprising a first data input semiconductor field-effect device, said first data device having a gate electrode, a source electrode, and a drain electrode, means for impressing a data input signal on the gate electrode of said first data device for controlling the conduction thereof, a first load semiconductor field-effect device with a gate electrode, a source electrode, and a drain electrode, means connecting said source electrode of said first load device to the drain electrode of said first data device for connecting said first load device in series with said first data device, a second data input semiconductor field-effect device with a gate electrode, a source electrode, and a drain electrode, said second data device being formed with a gate-source capacitance, a second load semiconductor field-effect device with a gate electrode, a source electrode and a drain electrode, means connecting said source electrode of said second load device to the drain electrode of said second data device for connecting said second load device in series with said second data device, an isolation semiconductor field-effect device with a gate electrode, a source electrode, and a drain electrode, means connecting the drain electrode of said isolation device to the drain electrode of said first data device and the source electrode of said isolation device to the gate electrode of said second data device, and means for impressing a first synchronizing signal on the gate electrode of said isolation device and the gate electrode of said first load device for controlling the conduction thereof between an on state and an off state, and means for impressing a second synchronizing signal on the gate electrode of said second load device for controlling the conduction thereof, said second synchronizing signal being out of time phase with said first synchronizing signal, whereby said off state of said isolation device isolates said second data device from said first data device, and said on state of said isolation device forms a path for device for connecting said first load device in series with second data device.

3. A shift register comprising: a first stage comprising six insulated gate field-effect transistors, the source-drain circuits of the first and second transistors being connected in series across a bias source, the source-drain circuits of the fourth and fifth transistors also being connected in series across said bias source, the source-drain circuit of the third transistor being connected between the junction of the first and second transistors and the gate of the fourth transistor, a first clock pulse source connected to the gates of said second and third transistors, a second clock pulse source connected to the gates of the fifth and sixth transistors, the source-drain circuit of the sixth transistor being connected between the junction of the fourth and fifth transistors and an output connection of said first stage, and a second stage identical to said first stage as thus described, the gate of the first transistor of said second stage being connected to said output connection of said first stage.

4. The shift register of claim 3 wherein the transconductance of the first and fourth transistors of each stage is greater than that of the second and fifth transistors of each stage, and wherein the transconductance of the third and sixth transistors of each stage is less than that of the first and fourth transistors and greater than that of the second and fifth transistors of each stage.

References Cited

UNITED STATES PATENTS

| | | | |
|---|---|---|---|
| 3,267,295 | 8/1966 | Zuk | 307—221 |
| 3,290,569 | 12/1966 | Weimer | 307—221 |
| 3,292,008 | 12/1966 | Rapp | 307—279 |

JOHN E. HEYMAN, *Primary Examiner.*